United States Patent [19]
Guthrie et al.

[11] Patent Number: 5,784,576
[45] Date of Patent: Jul. 21, 1998

[54] METHOD AND APPARATUS FOR ADDING AND REMOVING COMPONENTS OF A DATA PROCESSING SYSTEM WITHOUT POWERING DOWN

[75] Inventors: Guy Lynn Guthrie, Austin; Danny Marvin Neal, Round Rock, both of Tex.; Richard Allen Kelley, Apex, N.C.

[73] Assignee: International Business Machines Corp., Armonk, N.Y.

[21] Appl. No.: 741,466

[22] Filed: Oct. 31, 1996

[51] Int. Cl.⁶ .................. G06F 13/00; H03K 17/693; H04B 1/44
[52] U.S. Cl. ........................ 395/283; 395/311
[58] Field of Search ................ 395/281–283, 395/182.01, 311, 299; 364/492

[56] References Cited

U.S. PATENT DOCUMENTS

| | | | |
|---|---|---|---|
| 5,140,691 | 8/1992 | Austruy et al. | 395/182.08 |
| 5,248,905 | 9/1993 | Kuo . | |
| 5,317,697 | 5/1994 | Husak et al. . | |
| 5,488,572 | 1/1996 | Belmont . | |
| 5,491,830 | 2/1996 | Ferri . | |
| 5,517,650 | 5/1996 | Bland et al. | 395/750.05 |
| 5,577,215 | 11/1996 | Lee et al. | 395/311 |
| 5,586,271 | 12/1996 | Parrett | 395/283 |
| 5,619,661 | 4/1997 | Crews et al. | 395/299 |
| 5,625,777 | 4/1997 | Takahasi et al. | 395/283 |
| 5,675,809 | 10/1997 | Gantt | 307/147 |

FOREIGN PATENT DOCUMENTS

| | | |
|---|---|---|
| 0 674 274 A | 9/1995 | European Pat. Off. . |
| WO 93 15459 | 8/1993 | WIPO . |

OTHER PUBLICATIONS

"Hot Docking PCI–toPCI has link to ISA Past", Electronic Engineering, vol. 67, No. 827, Nov. 1, 1995, p. 14, XP000546828.

*Primary Examiner*—Gopal C. Ray
*Attorney, Agent, or Firm*—Richard A. Henkler

[57] ABSTRACT

A method and system for providing the ability to add or remove components of a data processing system without powering the system down ("Hot-plug"). The system includes an arbiter, residing within a Host Bridge, Control & Power logic, and a plurality of in-line switch modules coupled to a bus. Each of the in-line switch modules provide isolation for load(s) connected thereto. The Host Bridge in combination with the Control & Power Logic implement the Hot-plug operations such as ramping up and down of the power to a selected slot, and activating the appropriate in-line switches for communication from/to a load (target/controlling master).

15 Claims, 5 Drawing Sheets

5,784,576

METHOD AND APPARATUS FOR ADDING AND REMOVING COMPONENTS OF A DATA PROCESSING SYSTEM WITHOUT POWERING DOWN

BACKGROUND

1. Field of the Present Invention

In general, the present invention relates to data processing systems, and more particularly, to methods and apparatuses that allow the addition and removal of components from the system without powering down.

2. History of Related Art

Computers have become an integral part of our current society. As such, the demands and expectations for them have increased to a point where they must operate, in essence, on a continual basis. Unfortunately, over time, certain components of the computer may need to be updated or repaired. This typically results in powering the system down while the repair or update occurs. In today's robust environment, powering down the system is an unacceptable solution. This is especially true for sever type environments.

Consequently, it would be a distinct advantage to have a method and apparatus that would allow the repair or update to be performed without powering down the system during the process. It would also be advantageous if the method and apparatus would allow the system and its components thereof to continue operation during the repair or update. The present invention provides such an apparatus and method.

SUMMARY OF THE PRESENT INVENTION

In one aspect, the present invention is an apparatus for removing/inserting components of a data processing system without discontinuing power thereto. The apparatus includes a primary bus, and a plurality of secondary buses each having a device coupled thereto. The apparatus further includes selective means for selectively establishing a physical connection from the primary bus to one of the secondary buses, and for removing the connection. The apparatus also includes removing means for allowing each one of the devices to be removed without discontinuing power to the data processing system.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
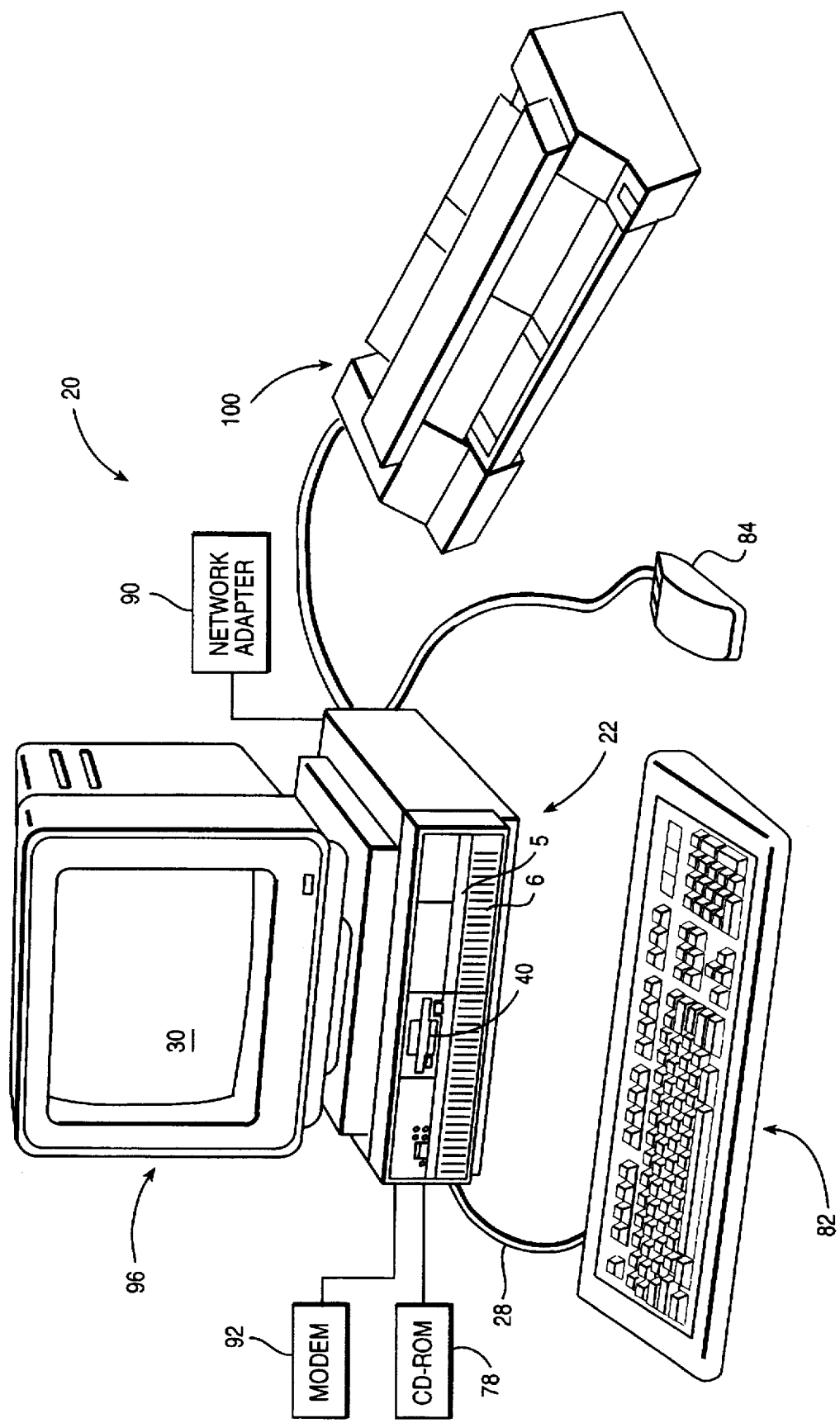
FIG. 1 is a data processing system in which the present invention can be implemented.

Reference now being made to FIG. 1, a data processing system 20 is shown in which the present invention can be implemented. The data processing system 20 includes processor 22, keyboard 82, and display 96. Keyboard 82 is coupled to processor 22 by a cable 28. Display 96 includes display screen 30, which may be implemented using a cather ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
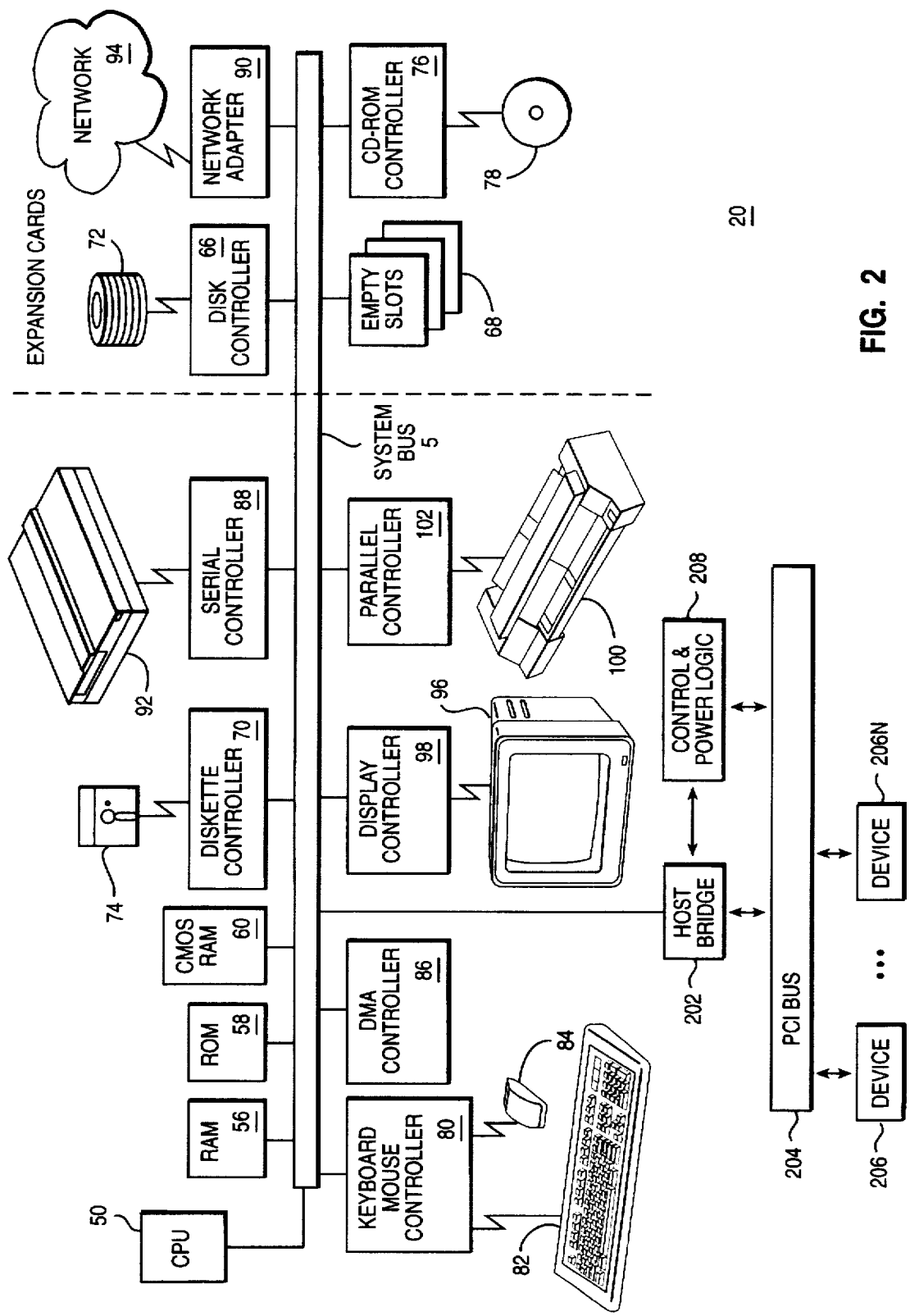
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For Laptop, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

As shown in FIG. 2, system bus 5 is connected to a PCI Host Bridge 202 for communication with PCI bus 204. As previously stated, PCI bus 204 is used for devices 206-206N which require fast communication response times.

It should be noted, and those of ordinary skill in the relevant art will readily recognize, that although many of devices are connected to system bus 5, any one of these devices could alternatively be connected to the PCI bus 204 (or PCI buses), or a standard expansion bus (e.g. ISA or EISA). In example, an additional bridge circuit could be attached to the system bus 5 or Primary PCI bus 204 to create a standard expansion bus for connection of the devices.

Host Bridge 202 facilitates communication between PCI bus 204 and system bus 5. Devices 206-206N are coupled to PCI bus 204. Control & Power Logic 208 is coupled to Host Bridge 202 and PCI bus 204, and provides control over the PCI bus 204 for swapping devices coupled thereto while power is still supplied to the system 20 (hereinafter referred to as "Hot-plug"). More specifically, in-line switch modules (not shown) in combination with the Control & Power Logic 208 provide the means for allowing a component, connected to the PCI bus 204, to be swapped or removed without "powering down" the entire data processing system 20.

Figure 3:
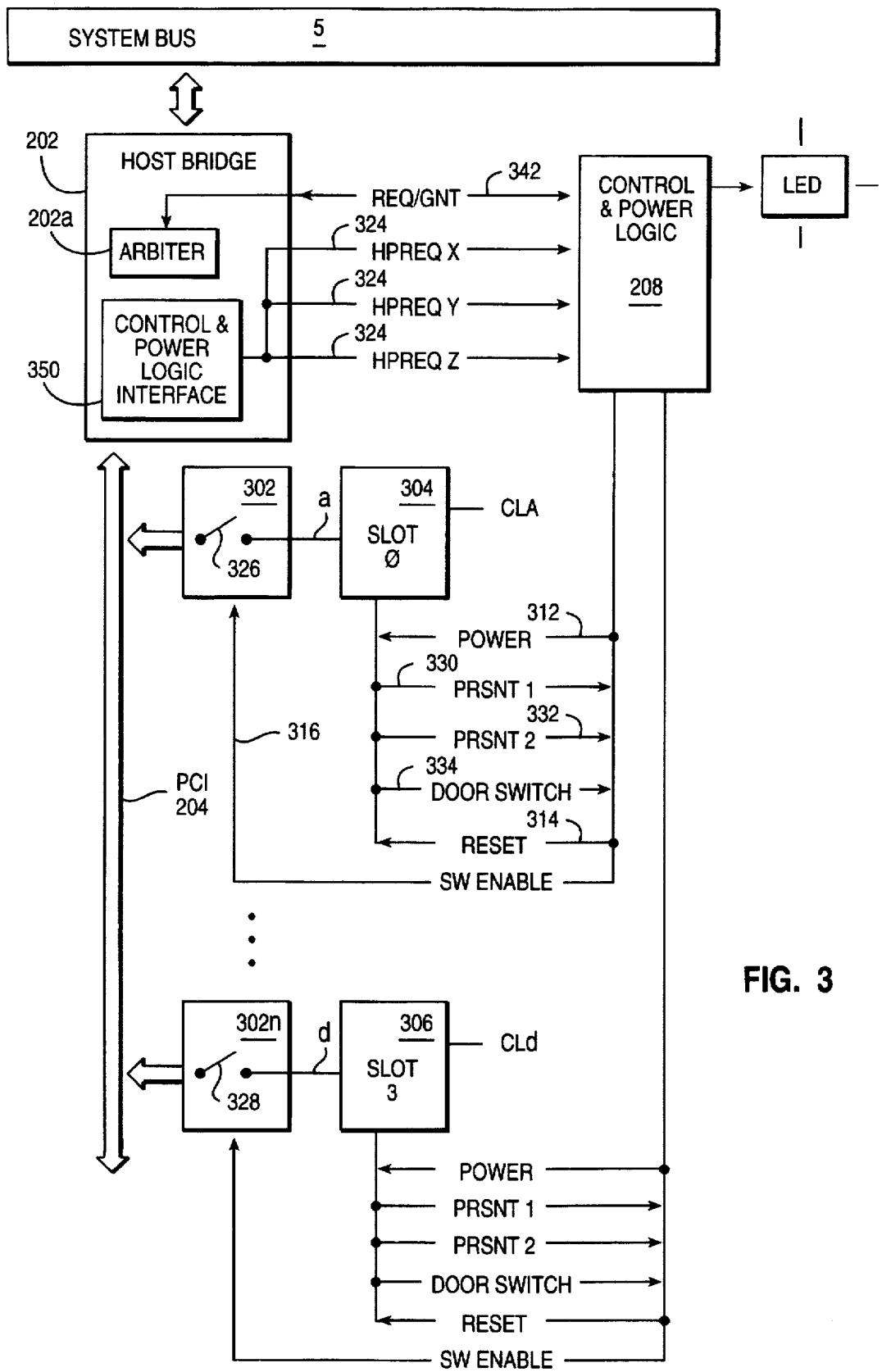
FIG. 3 is a schematic diagram illustrating in greater detail a configuration of the PCI bus of FIG. 2 for Hot-plug according to the teachings of the present invention.

Reference now being made to FIG. 3, a schematic diagram is shown illustrating in greater detail the configuration of PCI bus 204 of FIG. 2 for Hot-plug according to the teachings of the present invention. It should be noted that certain representational aspects of the present invention, as shown in FIG. 3, have been simplified in order to facilitate the explanation thereof. For instance, the request and grant lines have been represented as a single signal line, although in practicality they are each a separate signal line. As shown in FIG. 3, in-line switch modules 302-302N are coupled to PCI bus 204. In-line switch module 302 is representative of switch modules 302A-302N, and therefore, the explanation provided therewith is equally applicable to switch modules 302A-302N. In-Line switch module 302 includes a set of switches, as indicated by designation 326 that is used for switching the appropriate PCI bus 204 signal lines, and when closed creates a physically separate PCI compliant bus extensions (secondary PCI buses), as represented by designation "a".

These PCI bus extensions can be coupled with either a slot or soldered component depending upon the desired configuration. In this particular embodiment, a single slot is coupled to each PCI bus extension as illustrated by slots 304 and 306 for PCI bus extensions "a" and "d", respectively. Each of the slots are coupled to individual, clock signals, Power, Switch Enables signals, resets signals, Preset pins (PRSNT1, PRSNT2), and a Door Switch signal, as illustrated with Clock signal ClockA 310, Power 312, Switch Enable 316, Resets signal 314, PRSNT1 330, PRSNT2 332, and Door Switch 334.

As the in-line Switch Modules 302-302N are switched on and off, the PCI bus 204 is shielded from the load effects resulting therefrom via the Control & Power Logic 208 and Arbiter 202a of Host Bridge 202. In other words, as a set of switches, such as Switches 326 and 328, are "open", as determined by the Control & Power Logic 208 and corresponding SW enables 316 line, the respective PCI bus extensions are effectively isolated from PCI bus 204.

This isolation is a direct result of the high impedance of the switches from such an open state. In contrast, when the switches are "closed", as determined by the Control & Power Logic 208 and corresponding SW enable 316-316N lines, the respective PCI bus extensions appear as though they are an integrated portion of PCI bus 204. In the preferred embodiment of the present invention, the Switch Modules 302–302N have switches which can toggle between the open and close states in less than a nanosecond.

In general, Arbiter 202A in conjunction with Control & Power Logic 208 provides the means for isolation of a slot for Hot-plugging a device in either slot0 304 or slot3 306. Generally speaking, Arbiter 202A provides arbitration for control over PCI bus 204.

Control & Power Logic 208 is coupled to Arbiter 202A via REQ/GNT lines 342 and coupled to the Control & Power Logic Interface 350 via HPREQ X-Z lines 324. The REG/GNT lines 342 are used by the Control & Power Logic 208 for receiving momentary control (i.e. a few PCI clock cycles) of the PCI bus 204 to enable or disable the in-line Switch Modules 302–302N via their respective SW Enables lines 316–316N. The Control & Power Logic Interface 350 uses HPREQ X-Z to inform the Control & Power Logic 208 which one of the In-line Switch Modules 302–302N to enable or disable.

In general, the Control & Power Logic 208 in combination with the Host Bridge 202 controls:

1.) access to each one of the secondary PCI buses (bus extensions);

2.) power to each slot connected thereto (e.g. slot0 304 and slot3 306); and

3.) the gating (activation/deactivation) of the In-Line Switch Modules 302–302N.

Figure 4A:
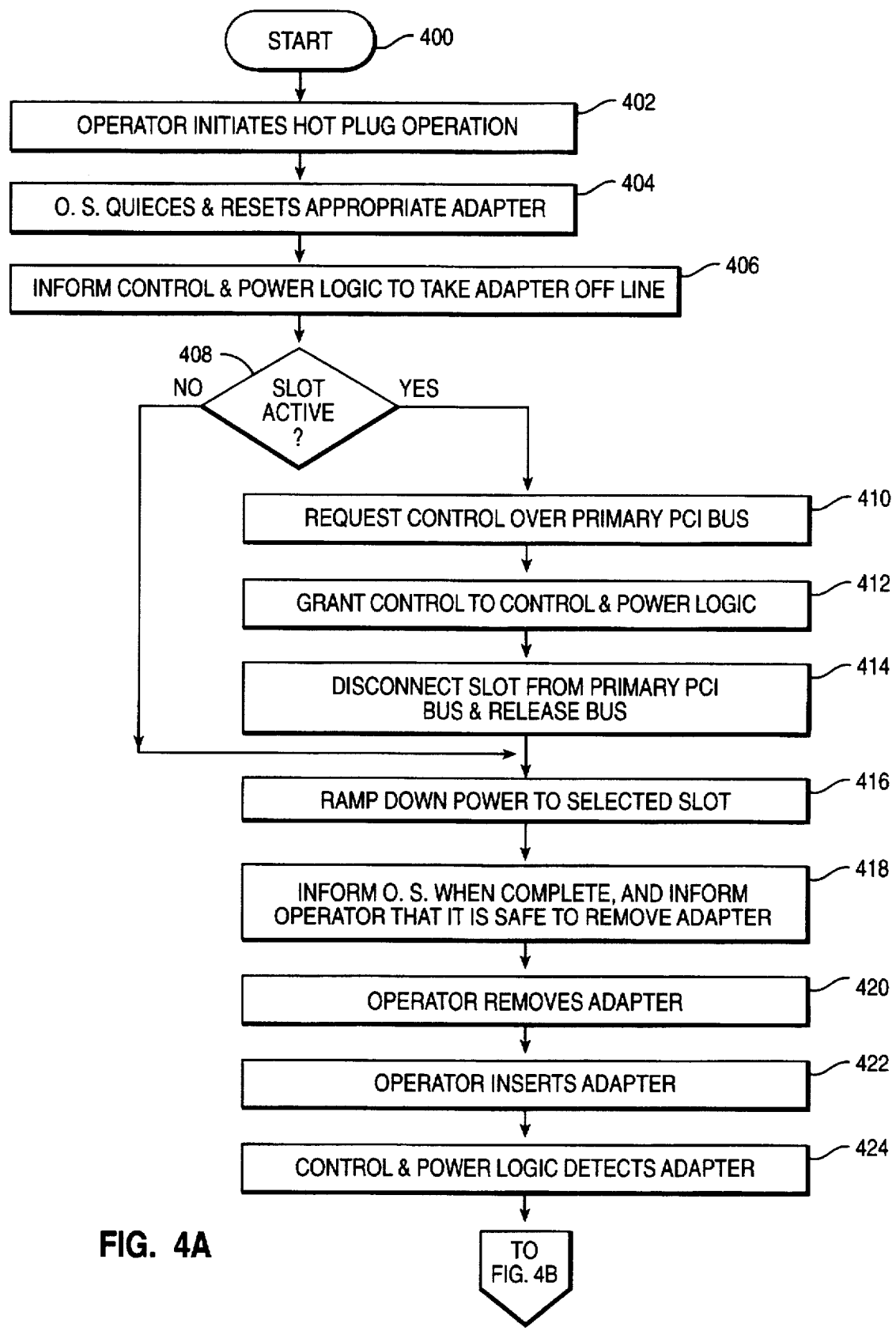
FIGS. 4A–4B are a flowchart illustrating the steps comprising the method used by the Control & Power Logic and Host Bridge of FIG. 3 for Hot-plugging operation according to the teachings of the present invention.
Figure 4B:
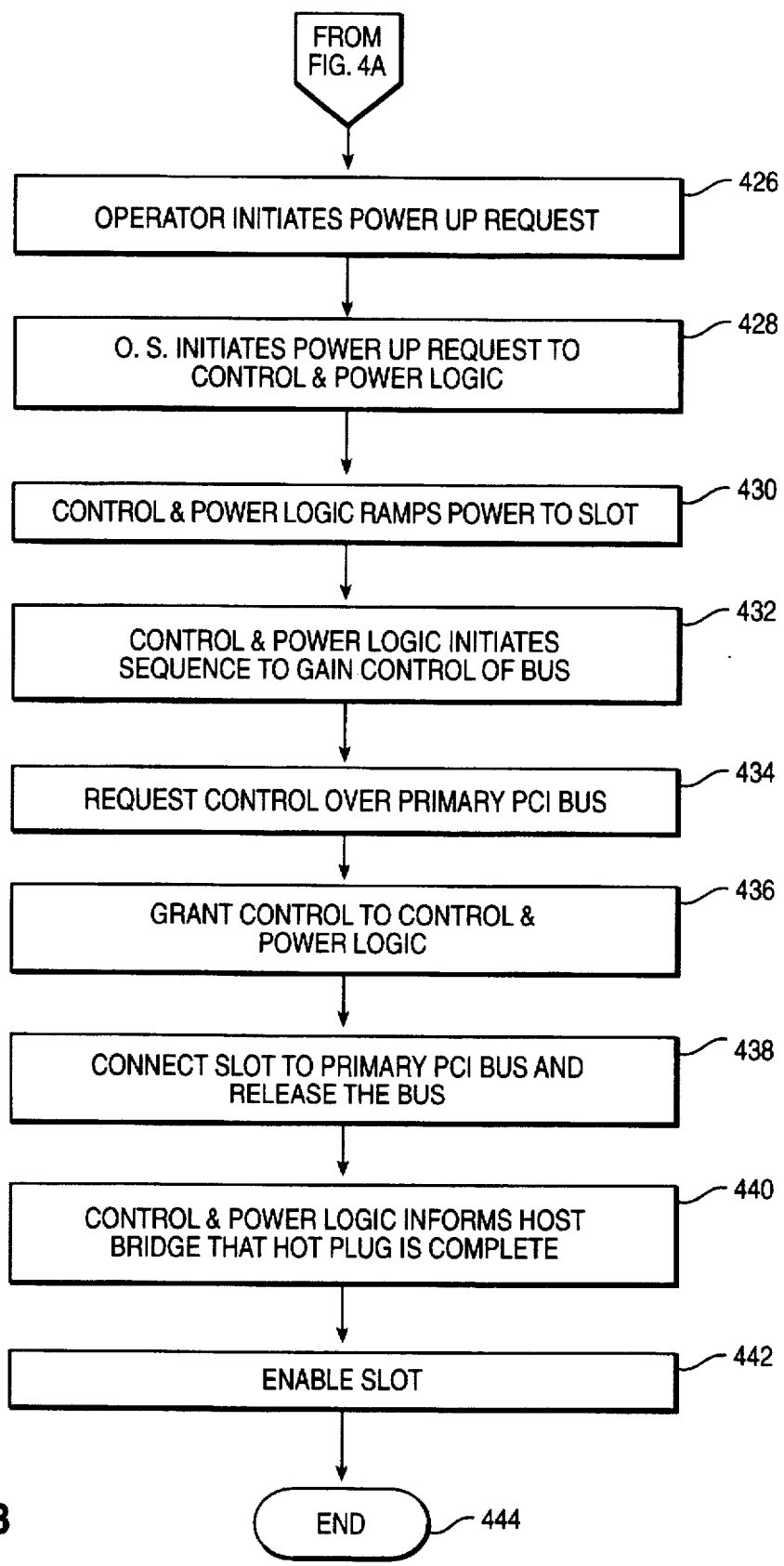

Reference now being made to FIGS. 4A–B, a flow chart is shown illustrating the steps comprising the method used by the Control & Power Logic 208 and Host Bridge 202 of FIG. 3 for Hot-plugging operation according to the teachings of the present invention.

Many of the components of FIG. 3 are referenced in conjunction with the description of FIG. 4. Consequently, any designations for such components represent those depicted and described in connection with FIG. 3. The method begins at step 400 where an operator of the data processing system 20 opens the door (not shown) of the slot (e.g. slot0 304 or slot3 306) having an adapter card to be removed. For discussion purposes, it is assumed hereinafter that slot0 304 is being used for this purpose.

The method then proceeds to step 402 where the operator initiates the Hot-plug sequence by initiating an O.S. System Management Operation, or other means (e.g. Hot-plug service software).

Thereafter, the method proceeds to step 404 where the O.S. quiesces, and resets the appropriate adapter. The term quiesce, as used herein, means to gracefully complete current activities while not accepting new activities. The method then proceeds to step 406 where the O.S. and/or Control & Power Logic Interface 350 informs the Control & Power Logic 208 via HPREQ X-Z 324 that slot0 304 needs to be taken off-line and powered down. In the preferred embodiment of the present invention, the HPREQ X-Z 324 signals are encoded as Hot-plug 0,1,2,3, ... n. It should be noted, however, and those of ordinary skill in the pertinent art will readily understand, that alternatively unique signals for each slot 304 and 306 could be used as well. During the power down or power up sequence, the Control & Power Logic 208 holds the reset to the adapter via RESET line 314.

The method then proceeds to step 408 where it is determined whether or not slot0 304 is active. If, at step 408, it is determined that slot0 304 is active, then the method proceeds to step 410. If, however, at step 408, it is determined that slot0 304 is inactive, then the method proceeds to step 416.

At step 410, the Control & Power Logic 208 requests momentary control over PCI bus 204 via REQ/GNT lines 342. The method then proceeds to step 412 where the Arbiter 202A grants permission for control to Control & Power Logic 208 via REQ/GNT lines 342. The method then proceeds to step 414 where the Control & Power Logic 208 deactivates the switch 326 for slot0 304 via a disable signal on Switch Enable line 316. Thus, removing slot0 304 from PCI bus 204. The REQ/GNT lines 342 are also released by the arbiter 202A, thus, removing control of the PCI bus 204 by the Control & Power Logic 208. It should be noted, however, that the total time for which Control & Power logic 208 controls the PCI bus 204 is only on the order of a few PCI bus 204 clock cycles.

The method then proceeds to step 416 where the Control & Power Logic 208 ramps down the power to slot0 304 (i.e. the adapter) in a manner to avoid any surging and resulting damage to the electronics. This step is implemented in fashion similar to that taught by co-pending application entitled "Adapter Card Slot Isolation For Hot Plugging", Ser. No. 08/552,035, which is hereby incorporated by reference herein.

Thereafter, the method proceeds to step 418 where the Control & Power Logic 208 informs the O.S. that power has been removed. The O.S. signals via an LED or other means that it is now safe to remove the adapter from slot0 304. In the preferred embodiment of the present invention, an LED, visible to the operator, is used for this purpose. Specifically, the following LED indications represent the states of the adapter as noted:

(1) On=The adapter (slot) is actively receiving power;

(2) Off=The adapter is not actively receiving power; and (3) Flashing=Permission is granted for removing the adapter from the slot.

At this point, the LED for slot0 would be flashing, and therefore, the operator is free to remove the adapter residing therein.

The method then proceeds to step 420 where the adapter card is physically removed from slot0 304. Thereafter, the method proceeds to step 422. At this point, it should be noted that when an adapter is not present in slot0 304, and the operator desires to insert one therein; they can proceed from this step forward.

At step 422, the operator inserts the replacement adapter card (or drive) into slot0 304. Thereafter, the method proceeds to step 424 where, in response to the insertion of the adapter card, the Control & Power Logic 208 detects the presence thereof via card preset pins PRSNT1 330 and PRSNT2 332, and optionally may be used in conjunction with a slot door switch 334 that indicates that the adapter card has been locked in place.

Reference now being made to FIG. 4B. The method then proceeds to step 426 where the operator initiates a power up request for slot0 304. Thereafter, the method proceeds to step 428 where the O.S. initiates a power-up request to the Control & Power Logic 208. The method then proceeds to step 430 where the Control & Power Logic 208 ramps the power back up to slot0 304. Thereafter, the method proceeds to step 432 where the Control & Power Logic 208 initiates sequence to gain control of the PCI bus 204. The method then proceeds to step 434 where the Control & Power Logic 208 requests momentary control over PCI bus 204 via REQ/GNT lines 342.

The method then proceeds to step 436 where the Arbiter 202a grants permission for control to Control & Power Logic 208 via REQ/GNT lines 342. Thereafter, the method proceeds to step 438 where the Control & Power Logic 208 activates the switch 326 for slot0 304 via an enable signal on Switch Enable line 316. Thus, reconnecting slot0 304 to PCI bus 204.

Thereafter, the method proceeds to step 440 where the Control & Power Logic 208 informs the Host Bridge 202 via an interrupt, or other means, that Hot-plug is complete. The method then proceeds to step 442 where the adapter card is enabled and configured by the O.S. The method then proceeds to end at step 442.

One skilled in the art can readily understand the Operating System or Hot-plug service software can interact directly with the Control & Power Logic 208 to support Hot-plugging of devices on the PCI bus 204. Alternatively, the Hot-plug service software can interact with the Host Bridge 202 which in turn interacts with the Control & Power Logic 208 to support Hot-plugging device on the PCI bus 204. By incorporating some of the Hot-Plug Control Logic in the Host Bridge 202 and allowing the Hot-plug service software to interact with the Host Bridge 202 to support Hot-plugging of PCI devices, this can result in a lower cost implementation.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. An apparatus for removing components of a data processing system without discontinuing power thereto, the apparatus comprising:

a primary bus;

a plurality of secondary buses each having a slot capable of receiving an electronic device;

selective means for selectively establishing a physical connection from the primary bus to one of the secondary buses, and for removing the connection, the selective means including:

a host bridge having an arbiter for receiving requests for control of the primary bus, and for selecting one of the requests as a master for the control;

a plurality of switches each for establishing the physical connection from the primary bus to one of the secondary buses, and for removing the connection;

removing means for allowing each one of the devices to be removed without discontinuing power to the data processing system, the removing means including:

means for detecting when a device resides within one of the slots; and means for detecting when an operator desires to remove one of the devices.

2. The apparatus of claim 1 wherein the selective means includes:

control logic means for enabling and disabling each of the switches whereby the physical connection is either established or removed; and power logic means for disabling power to the selected device to be removed.

3. The apparatus of claim 2 wherein each one of the switches includes:

means for receiving a signal indicating whether to establish or remove the connection.

4. The apparatus of claim 3 wherein the Host Bridge means includes:

means for informing the Control Logic which one of the devices is to be removed.

5. The apparatus of claim 4 wherein the Host Bridge includes:

means for informing the control logic to isolate the device to be removed.

6. The apparatus of claim 5 wherein the control logic means includes:

means, coupled to the arbiter, for gaining control over the primary bus prior to isolating and powering down the slot.

7. The apparatus of claim 6 wherein the control logic means includes:

means for transmitting, during control over the primary bus, an enable signal to the switches corresponding to the secondary buses desired to be connected to the primary bus.

8. The apparatus of claim 7 wherein the transmitting means includes:

means for transmitting, during control over the primary bus, a disable signal to the switches corresponding to the secondary buses desired to be removed from the primary bus.

9. The apparatus of claim 8 wherein the primary and secondary buses are peripheral component interconnect buses.

10. The data processing system of claim 5 wherein the control logic means includes:

means, coupled to the arbiter, for gaining control over the primary bus prior to granting control to the master;

means for disabling communication to the device to be removed;

means for transmitting, during control over the primary bus, an enable signal to the switches corresponding to the secondary buses desired to be connected or disconnected to the primary bus.

11. A data processing system comprising:

a primary bus;

memory, coupled to the primary bus, for storing instructions;

input means, coupled to the primary bus, for receiving input from a user;

a central processing unit for executing the stored instructions;

a display for displaying the results of the executed instructions and the received input;

a plurality of secondary buses each having at least one slot for connecting additional devices;

selective means for selectively establishing a physical connection from the primary bus to one of the secondary buses, and for removing the connection, the selective means including:

a plurality of switches for establishing the physical connection from the primary bus to one of the secondary buses, and for removing the connection;

an arbiter for receiving requests for control of the primary bus, and for selecting one of the requests as a master for the control;

removing means for allowing each one of the devices to be removed without discontinuing power to the data processing system, the removing means including:

means for detecting when a device resides within one of the slots; and means for detecting when an operator desires to remove one of the devices.

12. The data processing system of claim 11 wherein the selective means includes:

control logic means for enabling and disabling each of the switches whereby the physical connection is either established or removed; and power logic means for disabling power to the selected device to be removed.

13. The data processing system of claim 12 wherein each one of the switches includes:

means for receiving a signal indicating whether to establish or remove the connection.

14. The data processing system of claim 13 wherein the selective means includes:

means for informing the Control Logic which one of the devices is to be removed.

15. The data processing system of claim 14 wherein the selective means includes:

means for informing the control logic to disable the device to be removed.

* * * * *